(12) United States Patent
Keller

(10) Patent No.: US 6,854,274 B2
(45) Date of Patent: Feb. 15, 2005

(54) SYSTEM AND METHOD FOR EFFICIENT LOAD FOLLOWING CONTROL LOGIC FOR A TURBOGENERATOR OPERATING IN STAND-ALONE MODE

(75) Inventor: Tim Keller, Albuquerque, NM (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 10/065,101

(22) Filed: Sep. 17, 2002

(65) Prior Publication Data

US 2004/0050066 A1 Mar. 18, 2004

(51) Int. Cl.$^7$ .............................................. F02C 6/18
(52) U.S. Cl. ..................................... 60/773; 60/39.281
(58) Field of Search ............................... 60/773, 39.281

(56) References Cited

U.S. PATENT DOCUMENTS

| | | | |
|---|---|---|---|
| 4,922,710 A | * | 5/1990 | Rowen et al. ........... 60/39.281 |
| 5,274,996 A | | 1/1994 | Goff et al. |
| 6,064,122 A | | 5/2000 | McConnell |
| 6,066,898 A | | 5/2000 | Jensen |
| 6,281,595 B1 | | 8/2001 | Sinha et al. |
| 6,564,774 B2 | * | 5/2003 | Ellims et al. ........... 123/352 |

* cited by examiner

Primary Examiner—Louis J. Casaregola
(74) Attorney, Agent, or Firm—Sutherland Asbill & Brennan LLP

(57) ABSTRACT

Systems and methods are provided for controlling the rotational speed of a turbogenerator in stand-alone mode to account for a present operating load and a transient reserve capability. A base speed set point may be received, comprising a baseline speed setting for the turbogenerator. A speed offset may be determined comprising an adjustment to the base speed set point required to accommodate the transient reserve capability. An adjusted speed set point may be produced by combining the base speed set point and the speed offset. The rotational speed of the turbogenerator may then be set to the adjusted speed set point.

25 Claims, 3 Drawing Sheets

SYSTEM AND METHOD FOR EFFICIENT LOAD FOLLOWING CONTROL LOGIC FOR A TURBOGENERATOR OPERATING IN STAND-ALONE MODE

BACKGROUND OF INVENTION

Technical Field

The present invention relates to turbogenerators and more particularly relates to a system and method for controlling and optimizing the rotational speed of turbogenerators to increase efficiency.

Turbogenerators are used as distributed power generation systems to generate on-site power at locations such as consumer premises, e.g., businesses, homes, or other facilities. Turbogenerators can be connected in parallel to a power grid or run in stand-alone mode. When run in a grid connected mode, power loads demanded on a turbogenerator can be supplemented by power from the grid. The power reserve provided by the grid allows the turbogenerator to run more efficiently because the turbogenerator does not become "loaded down" by transient load demands. Thus, a grid-connected turbogenerator can continue to operate at its optimal speed and temperature without concern for transient reserve loads.

In stand-alone mode, the turbogenerator is solely responsible for all power loads demanded by the consumer. The stand-alone turbogenerator does not have the benefit of the power grid to supplement power for transient loads. Currently, stand-alone turbogenerators run at a set rotational speed, and to withstand the potential transient loads, that speed must be relatively high. As the load increases, however, the amount of transient reserve load decreases and the turbogenerator does not need to maintain such a high rotational speed because the potential for increased load has decreased. For instance, at 100% load, there is no remaining transient reserve load, but stand-alone turbogenerators will continue to run at a constant high rotational speed. The turbogenerator in stand-alone mode thus may expend a significant amount of energy maintaining a constant high rotational speed at all operating conditions. Maintaining that high rotational speed may be wasteful.

Thus, there is a desire to increase the efficiency of a turbogenerator system by, among other things, controlling the rotational speed of the turbogenerator for the instantaneous and transient operating conditions.

SUMMARY OF INVENTION

In one aspect, a method is provided for controlling the rotational speed of a turbogenerator in stand-alone mode to account for a present operating load and a transient reserve capability. A base speed set point may be received. A speed offset may be determined comprising an adjustment to the base speed set point required to accommodate the transient reserve capability. An adjusted speed set point may be determined by combining the speed offset with the base speed set point. The rotational speed of the turbogenerator may then be set to the adjusted speed set point.

In one aspect, a method is provided for controlling the rotational speed of a turbogenerator in stand-alone mode to account for a present operating load and a transient reserve capability. A base speed set point for the turbogenerator is received. A speed offset is determined comprising an adjustment to the base speed set point required to accommodate the present operating load and the transient reserve capability. An adjusted speed set point may be determined by combining the speed offset with the base speed set point. The adjusted speed set point is trimmed and the rotational speed of the turbogenerator is set to the trimmed speed set point.

In one aspect, a system is provided which comprises a sensor for generating a sensor feedback signal indicating the present operating load conditions of the turbogenerator including speed, load, temperature and/or pressure, a flow control valve for controlling an amount of fuel supplied to a combustor, the combustor producing hot expanding gases used to rotate a turbine, and a controller functionally connected to the sensor and to the flow control valve for receiving the sensor feedback signal from the sensor and for sending a command to the flow control valve. The controller executes computer-executable instructions for performing the steps comprising: receiving a base speed set point for the turbogenerator, determining a speed offset comprising an adjustment to the base speed set point required to accommodate the present operating load and the transient reserve capability, determining an adjusted speed set point by combining the speed offset with the base speed set point, and generating the command for instructing the flow control valve to regulate the amount of fuel that is supplied to the combustor such that the rotational speed of the turbogenerator is set to the adjusted speed set point.

DETAILED DESCRIPTION

The present invention includes methods and systems for efficiently controlling the operating speed of a turbogenerator in stand-alone mode. An exemplary embodiment of the present invention takes the form of a computer implemented speed control loop that controls the operating speed of the turbogenerator based on load, speed, temperature, and/or pressure.

Briefly described, an exemplary embodiment of the present invention may be a closed-loop control system for a stand-alone turbogenerator with load, speed, temperature, and pressure feedbacks. The speed control loop may be configured to increase the speed of the turbogenerator as the operating load decreases so as to allow the turbogenerator to withstand potential transient reserve loads. As the operating load increases, however, the speed control loop may decrease the speed of the turbogenerator to account for a decrease in potential transient reserve loads. As will be explained below, the speed control loop may include a base speed set point input, transient reserve logic, appropriate filters, and trim logic to increase the efficiency of the stand-alone turbogenerator.

The transient reserve logic calculates a rotational speed of the turbogenerator that is needed to withstand the transient reserve load of the system. The transient reserve load is the difference between the operating load and maximum load allowable. The rotational speed calculated by the transient reserve logic may be expressed in terms of a "speed offset."

An adjusted speed set point for the turbogenerator may be calculated by combining the base speed set point with the speed offset. The adjusted speed set point may be filtered, for example using an engine dynamics filter, to account for dynamic characteristics of the turbogenerator. The trim logic may be employed to further trim the filtered speed set point to ensure that the turbogenerator continues to operate within desired or allowable operating parameters. The trimmed speed set point may then be used to control the rotational speed of the turbogenerator.

In certain embodiments, a turbogenerator may take the form of a microturbine. For the sake of simplicity, the exemplary embodiments described hereinafter will refer specifically to a microturbine. However, those skilled in the art will appreciate that the general principles of the present invention apply to not only microturbines but any other forms of turbogenerators. Referring now to the figures in which like numerals indicate like elements throughout the several figures, aspects of the present invention and a suitable operating environment will be described.

Figure 1:
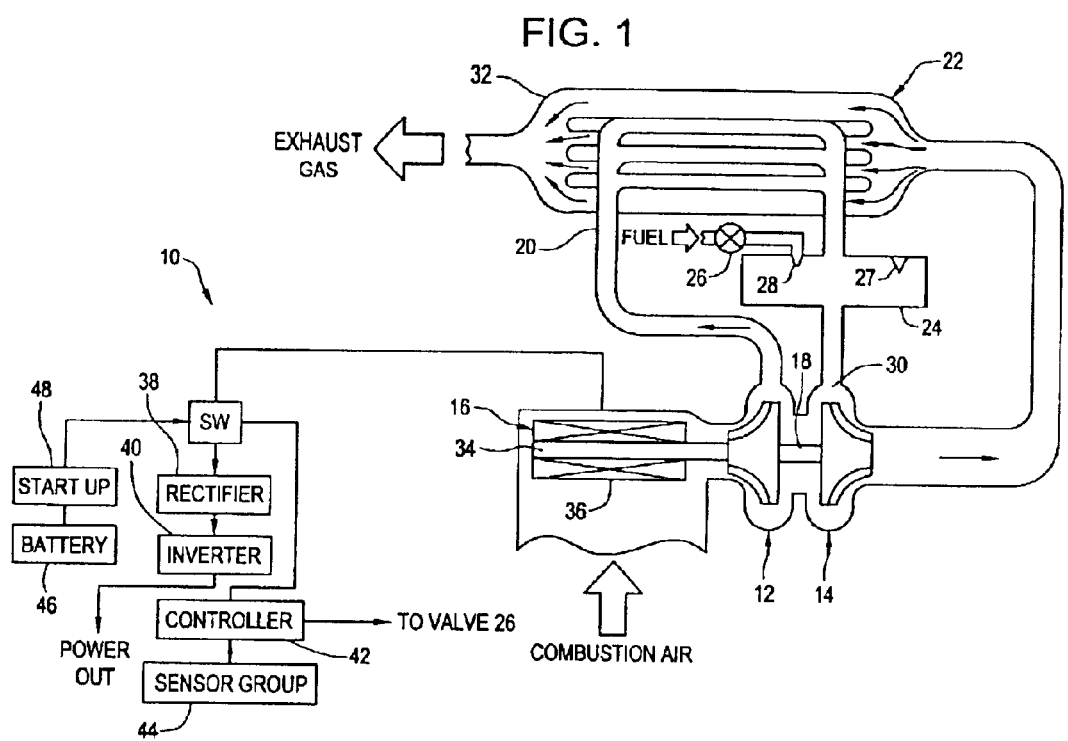
FIG. 1 is a block diagram illustrating certain components of a microturbine generator in accordance with an embodiment of the present invention.

FIG. 1 is a block diagram illustrating some of the components of an exemplary microturbine 10. The microturbine 10 shown in FIG. 1 is provided by way of example only and is intended to represent one possible operating environment for the present invention. A microturbine 10 useful with the present invention may be a microturbine sold under the mark "Parallon 75®" by General Electric Corporation of Schenectady, N.Y. Generally described, the "Parallon 75®" microturbine includes a turbine 14, a compressor 12, and a two-pole permanent magnetic generator rotor 34 mounted on a single high-speed shaft 18 via a number of air bearings. The "Parallon 75®" microturbine may generate about 75 kilowatts (75 kW) of electricity. Those skilled in the art will appreciate that other configurations and components for microturbines exist or may be developed. The compressor 12, the turbine 14 and the generator rotor 34 can be rotated by a single shaft 18 as shown, or can be mounted to separate shafts.

Air entering an inlet of the compressor 12 is compressed. Compressed air leaving an outlet of the compressor 12 is circulated through cold side passages 20 in a cold side of a recuperator 22. In the recuperator 22, the compressed air absorbs heat, which enhances system efficiency. The heated, compressed air leaving the cold side of the recuperator 22 is supplied to a combustor 24.

Fuel is also supplied to the combustor 24. Both gaseous and liquid fuels can be used. In gaseous fuel mode, any suitable gaseous fuel can be used. Choices of fuel include diesel, flare gas, off gas, gasoline, naphtha, propane, JP-8, methane, natural gas and other man-made gases. The flow of fuel is controlled by a flow control valve 26. The fuel is injected into the combustor 24 by an injection nozzle 28.

Inside the combustor 24 the fuel and compressed air are mixed and ignited by an igniter 27 in an exothermic reaction. The combustor 24 may contain a suitable catalyst capable of combusting the compressed, high temperature, fuel-air mixture at the process conditions. Some known catalysts usable in the combustor 24 include platinum, palladium, as well as metal oxide catalyst with active nickel and cobalt elements.

After combustion, hot, expanding gases resulting from the combustion are directed to an inlet nozzle 30 of the turbine 14. The hot, expanding gases resulting from the combustion are expanded through the turbine 14, thereby creating turbine power. The turbine power, in turn, drives the compressor 12 and the electrical generator 16.

Turbine exhaust gas is circulated by hot side passages 32 in a hot side of the recuperator 22. Inside the recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the gas exits the recuperator 22. Additional heat recovery stages could be added onto the microturbine 10.

The generator 16 can be, for example, a ring-wound, two-pole toothless (TPTL) brushless permanent magnet machine having a permanent magnet rotor 34 and stator windings 36. The turbine power generated by the rotating turbine 14 is used to rotate the rotor 34. The rotor 34 is attached to the shaft 18. When the rotor 34 is rotated by the turbine power, an alternating current is induced in the stator windings 36. Speed of the turbine can be varied in accordance with external energy demands placed on the microturbine 10. Variations in the turbine speed will produce a variation in the frequency of the alternating current generated by the electrical generator 16. Regardless of the frequency of the ac power generated by the electrical generator 16, the ac power can be rectified to dc power by a rectifier 38, and then chopped by a solid-state electronic inverter 40 to produce ac power having a fixed frequency. Accordingly, when less power is required, the turbine speed can be reduced without affecting the frequency of the ac output.

Moreover, reducing the turbine speed reduces the airflow because the compressor runs slower. Consequently, the turbine inlet temperature remains essentially constant, thus maintaining a high efficiency at partial load. Use of the rectifier 38 and the inverter 40 allows for wide flexibility in determining the electric utility service to be provided by the microturbine 10 of the present invention. Because any inverter 40 can be selected, frequency of the ac power can be selected by the consumer. If there is a direct use for ac power at wild frequencies, the rectifier 38 and inverter 40 can be eliminated.

The microturbine 10 also can include a battery 46 for providing additional storage and backup power. When used in combination with the inverter 40, the combination can provide uninterruptible power for hours after generator failure.

A controller 42 controls the turbine speed by controlling the amount of fuel flowing to the combustor 24. The controller 42 uses sensor signals generated by a sensor group 44 to determine the external demands upon the microturbine 10. The sensor group 44 could include sensors such as position sensors, turbine speed sensors and various temperature and pressure sensors for measuring operating temperatures and pressures in the microturbine 10. Using the aforementioned sensors, the controller 42 controls both startup and optimal performance operation. As will be discussed below relating to FIGS. 2 and 3, the controller 42 may execute a speed control loop that adjusts the rotational speed of the microturbine, based in part on feedback signals received from the sensors 44, so as to increase its efficiency.

A switch/starter control 48 can be provided off-skid to start the microturbine 10. Rotation of the compressor 12 can be started by using the generator 16 as a motor. During startup, the switch/starter control 48 supplies an excitation current to the stator windings 36 of the electrical generator 16. Startup power is supplied by the battery 46. In the alternative, a compressed air device could be used to motor the microturbine 10.

Figure 2:
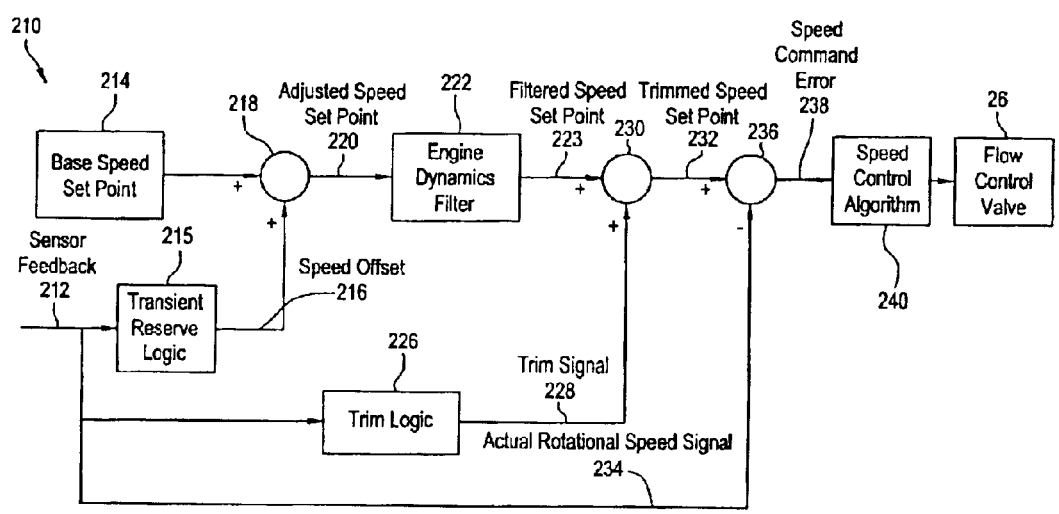
FIG. 2 is a block diagram illustrating an exemplary speed control loop for a stand-alone turbogenerator according to an embodiment of the present invention.

FIG. 2 is a block diagram illustrating an exemplary speed control loop 210 for a microturbine operating in stand-alone mode. Those skilled in the art will appreciate that the speed control loop 210 may comprise computer-executable instructions stored in a computer-readable medium and executed by the controller 42 of the microturbine 10.

A base stand-alone speed set point (hereinafter referred to as a "base speed set point" 214) may be input as the baseline rotational speed for the microturbine 10 and may be a constant speed setting. The base speed set point alternatively may be a function of the ambient conditions of the microturbine 10. In an exemplary embodiment, the base speed set point 214 may be the lowest desired operating speed of the microturbine 10. The present invention also is contemplated to have any speed setting as the base speed set point 214, such as a maximum speed setting or an adjusted speed setting between the maximum and minimum speed settings. The base speed set point 214 may be entered through any suitable input mechanism, such as a control interface of the microturbine 10, a personal computer or other device in communication with the microturbine 10, etc. Alternatively, a particular base speed set point 214 may be hard-coded into the software and/or firmware logic that executed by the controller 42 to implement the speed control loop 210. In another embodiment, the base speed set point 214 may be a function of the ambient conditions of the microturbine 10. Ambient conditions such as actual load, speed, temperature, or pressure may be used to calculate the base speed set point at any discrete time interval using any appropriate mathematical function or algorithm.

Transient reserve logic 215 may be used to calculate a speed offset 216 that may be combined with the base speed set point 214 to account for the transient reserve capability of the stand-alone microturbine 10. The transient reserve capability is the amount of load that can be demanded from the microturbine 10 at a given operating load. For example, if the microturbine 10 is operating at 80% of maximum load, the transient reserve capability is 20% of maximum load. Sensors 44 (see FIG. 1) may be used to determine operating conditions of the microturbine 10, such as speed, load, temperature, and pressure. Sensor feedback signals 212, indicating the operating conditions of the microturbine 10, are fed back into the speed control loop 210.

The transient reserve logic 215 in an exemplary embodiment may determine the speed offset 216 based on speed and load operating conditions indicated in the sensor feedback signals 212 and operational limits of the microturbine 10. The transient reserve logic 215 calculates the speed offset 216 necessary to quickly command the microturbine 10 to the proper speed to accommodate a given operating load. The transient reserve logic 215 also ensures that the operating conditions, such as speed, temperature, and pressure, do not exceed the microturbine's 10 operational limits. A look-up table or any other appropriate mathematical equation or model may be used to determine the proper speed offset 216 for a given operating load and speed.

An adjusted speed set point 220 may be produced by combining the speed offset 216 with the base speed set point 214, for example by supplying the base speed set point 214 signal and the speed offset 216 signal to a first summing junction 218. Those skilled in the art will appreciate that other methods for producing the adjusted speed set point 220 based on the base speed set point 214 and the speed offset 216 may be employed. For example, the signals may be combined by any appropriate mathematical-based function.

In certain embodiments, the base speed set point 214 may be the minimum operating speed of the microturbine 10. The speed offset 216 may range from 0 revolutions per minute (RPM) to the difference between the maximum operating speed and the minimum operating speed. By way of illustration, the minimum operating speed may be about 50,000 RPM and the maximum operating speed may be about 65,000 RPM. In this example, the speed offset 216 may range from 0 to about 15,000 RPM. The transient reserve logic 215 may determine the speed offset 216 in the aforementioned range that is appropriate for the transient reserve capability. That is, the speed offset 216 will either increase or decrease the speed of the microturbine 10 depending on transient reserve capability. Those skilled in the art will appreciate that the base speed set point 214 is not limited to the minimum speed of the microturbine 10 and can be set at any appropriate speed. Also, the speed offset 216 is not limited to the difference between the minimum and maximum operating speeds, but may be any value that can be combined with the base speed set point 214.

The adjusted speed set point 220 may be filtered using an engine dynamics filter 222 to account for actual characteristics of the microturbine 10 and to produce a filtered speed set point 223. As known to those skilled in the art, the engine dynamics filter 222 may be configured to account for dynamic microturbine characteristics, such as fuel injection attributes, rotor dynamics, and other properties. The engine dynamics filter 222 may be a simple first order filter or any other more complex filter model, such as multiple order, recursive, or non-recursive filter known in the art. Although use of the filter 222 is optional, the discussion to follow will assume that a filter is employed in the exemplary speed control loop 210. Those skilled in the art will recognize that any mention of the filtered speed set point 223 may be replaced by the adjusted speed set point 220 if no filter is employed.

Trim logic 226 may be implemented to further trim the filtered speed set point 223. The sensor feedback 212 may be an input to the trim logic 226. The trim logic 226 may increase or decrease the filtered speed set point 223 based on the sensor feedback 212 to optimize the efficiency of the microturbine 10 and to further ensure that the microturbine 10 operates inside of maximum and minimum operating parameters or other desired parameters. In an exemplary embodiment, the trim logic 226 may use speed and temperature measurements from the sensor feedback 212 to optimize the temperature and speed of the microturbine 10 to increase efficiency. In particular, the trim logic 226 may calculate a temperature margin needed to accommodate the transient reserve capability and may preserve that temperature margin by limiting the filtered speed set point 223.

By way of illustration only, if the maximum temperature for the stand-alone microturbine 10 is about 1200 degrees and the microturbine 10 is not currently operating at 100% load and about a 200 degree temperature margin is required to reach 100% load, the trim logic 226 may regulate the system temperature so that it does not exceed 1000 degrees. This temperature regulation ensures that about a 200 degree temperature margin is preserved. Thus, for example, if the filtered speed set point 223 commands a speed that produces a temperature above about 1000 degrees, the trim logic 226 will adjust the filtered speed set point 223 downward to keep the temperature at about 1000 degrees or less. Similar trim logic 226 may be implemented to preserve a pressure margin for the microturbine 10. For instance, preserving temperature and pressure margins may allow the controller 42 of the microturbine 10 to increase rotational speed to account for an increase in transient reserve capability without exceeding temperature or pressure limitations.

The trim logic 226 in the present invention may be any method known in the art that preserves temperature and pressure margins and keeps the microturbine 10 from operating outside of its acceptable parameters. The trim logic 226 may be implemented as a simple proportional integral derivative ("PID") controller, a simple integral controller with a small gain, or any other controller that is appropriate to trim the filtered speed set point 223.

The trim logic 226 produces a trim signal 228. The trim signal 228 may be used to further adjust the filtered speed set point 223 upward or downward to produce a trimmed speed set point 232. If no adjustment to the filtered speed set point 223 is required, the trim signal 228 may be zero or not used. The filtered speed set point 223 may be trimmed by combining it with the trim signal 228 at a second summing junction 230. Those skilled in the art will appreciate that other methods for trimming the filtered speed set point 223 based on the trim signal 228 may be employed. For example, the signals may be combined by any appropriate mathematical-based function.

In an exemplary embodiment that includes the battery 46 added to the microturbine system, the trim logic 226 and transient reserve capability logic 215 may be used to more precisely optimize the operation of the microturbine system to increase efficiency. Any of the operating parameters of the microturbine system, such as speed, temperature, and pressure, may be optimized to increase efficiency. The battery 46 may supply a load when a load increase is demanded. Without the battery 46 added to the system, the trim logic 226 and transient reserve capability logic 215 may be used for quickly accommodating the demanded load because the microturbine 10 must accommodate for all loads itself. The inclusion of the battery 46 allows the stand-alone microturbine 10 to act as if the microturbine 10 was in grid-connected mode. Since the battery 46 may aid the microturbine 10 in accommodating demanded loads, the microturbine 10 resources are expended less and the trim logic 226 and the transient reserve capability logic 215 may thus be used primarily for increasing the efficiency of the microturbine 10 as opposed to quickly accommodating the demanded load. Even with the battery 46 added to the microturbine system, the trim logic 226 and transient reserve capability logic 215 may command the microturbine 10 to accommodate a portion of the demanded loads so as to not rely on the battery to accommodate all demanded loads.

A speed command error 238 may be calculated by subtracting the actual rotational speed 234 of the microturbine 10 from the trimmed speed set point 232 at a third summing junction 236. The actual rotational speed signal 234 of the microturbine may be included in the feedback signal 212 of the feedback loop. The speed command error 238 represents the change in speed, from the actual rotational speed of the microturbine 10, required to efficiently meet the present load demands. The speed command error 238 may be used by the controller 42 to generate a command for controlling the flow control valve 26. The flow control valve 26 may regulate the amount of fuel that is supplied to the combustor 24 of the microturbine 10 so as to set the rotational speed of the turbine 14 to the trimmed speed set point 232. The speed command error 238 may be created either on a continuous basis or at discrete intervals. The discrete intervals may be at any rate appropriate to adequately control the speed of the microturbine 10.

One skilled in the art will appreciate that the speed command error 238 may be input into a speed control algorithm 240 prior to controlling the flow control valve 26. The speed control algorithm 240 may be a simple PID control algorithm or a more complex control algorithm appropriate for the desired responsiveness of the microturbine 10. The speed control algorithm 240 may be used by the controller 42 to generate the command for controlling the flow control valve 26.

Figure 3:
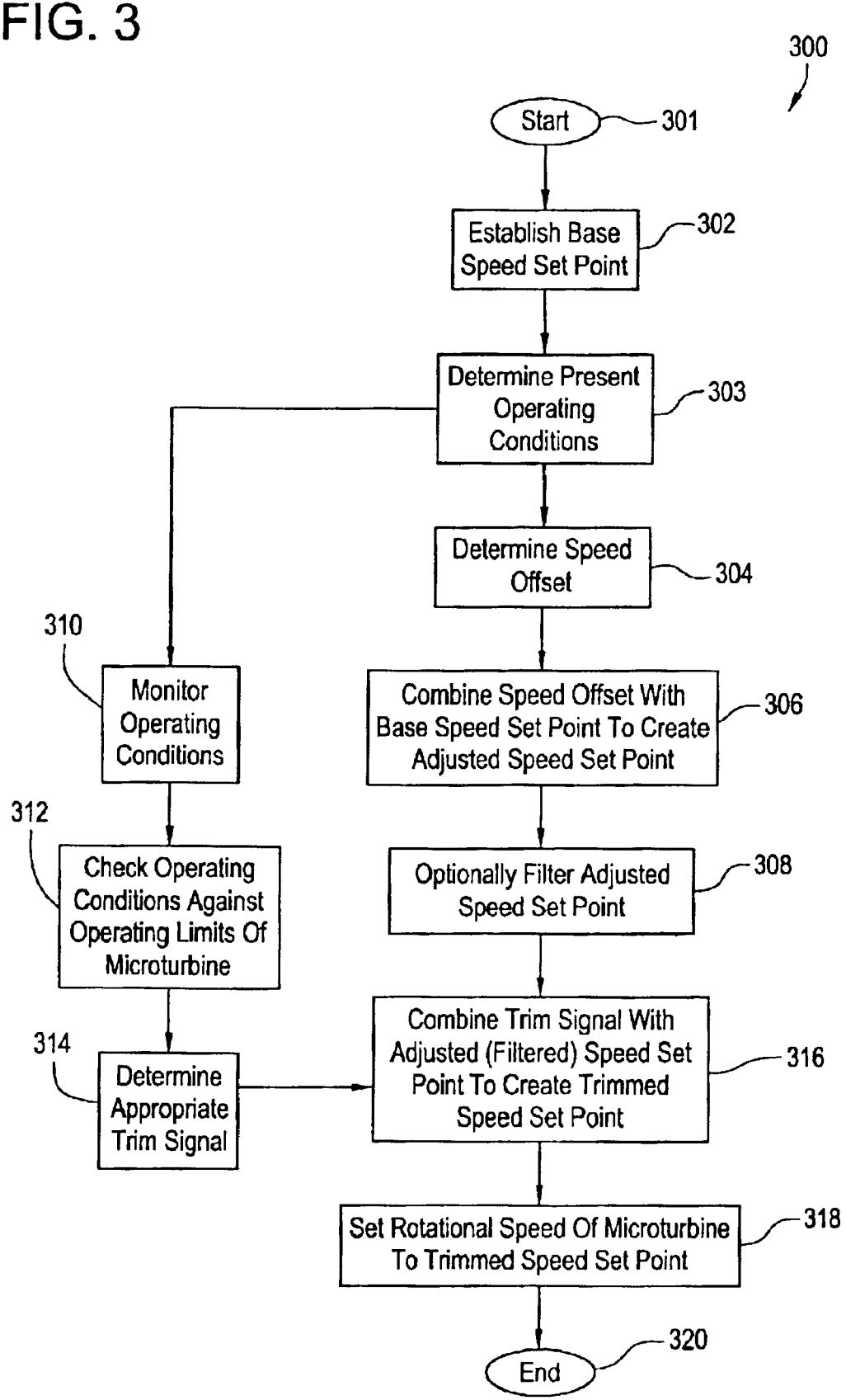
FIG. 3 is a flow diagram illustrating an exemplary method for controlling the rotational speed of a turbogenerator according to an embodiment of the present invention.

FIG. 3 is a block diagram illustrating an exemplary method 300 for efficiently controlling the rotational speed of a microturbine 10 operating in stand-alone mode. The method begins at starting block 301 and advances to step 302, where the base speed set point 214 is established. At step 303 present operating conditions of the microturbine 10 are determined using the sensor group 44 described previously in FIG. 1. The sensor group 44 may determine, for instance, speed, load, temperature, and pressure.

At step 304, the speed offset 216 may be determined from the transient reserve logic 215 based on the speed and load determinations from the sensor group 44. As discussed previously, the transient reserve logic 215 may calculate a speed offset 216 based on the transient reserve capability of the microturbine 10 at that given time. At step 306, the speed offset 216 may be combined with the base speed set point 214 to determine the adjusted speed set point 220. The adjusted speed set point 220 may be the speed necessary to account for the operating load conditions and the transient reserve capability of the microturbine 10. Thus, the adjusted speed set point 220 may become the desired speed for the microturbine 10.

Step 308 is an optional filtering step, where the adjusted speed set point 220 may be filtered with an engine dynamics filter 222 or other appropriate filter. An engine dynamics filter 222 may be used to account for dynamic engine characteristics. The speed control loop 210 may operate without an engine dynamics filter 220 or other filter.

Steps 310, 312, and 314 are implemented in the trim logic 226. Present operating conditions indicated by sensor feedback signals 44 are inputs to the trim logic 226, which monitors the operating conditions at step 310 and relates them to the maximum and minimum operating parameters of the microturbine 310 at step 312. A microturbines 10 has minimum and maximum operating limits for operating parameters such as temperature, pressure, speed, and load, and at step 312 it is determined whether the filtered speed set point 223 will force the microturbine 10 to run at conditions outside of the acceptable operating parameters. At step 312 it may also be determined whether the filtered speed set point 223 violates temperature and pressure margins that are required to accommodate for the transient reserve capability of the microturbine 10.

At step 314, a trim signal 228 is produced based on the determinations of step 312. At step 316 the filtered speed set point 223 is trimmed by combining the filtered speed set point 223 with the trim signal 228. At step 318, the trimmed speed set point 232 is used to set the rotational speed of the microturbine 10. The exemplary method 300 ends at step 320.

As may be seen from the foregoing, the present invention provides systems and methods for controlling the rotational speed of a turbogenerator operating in stand-alone mode to increase the efficiency of the turbogenerator. Those skilled in the art will appreciate that the foregoing description of the invention was provided by way of example only and that many other modifications, features, embodiments and operating environments of the present invention are possible. It should also be appreciated that the exemplary aspects of the present invention as described above are not intended to be interpreted as required or essential elements of the invention, unless explicitly stated as such.

What is claimed is:

1. A method for controlling the rotational speed of a variable speed turbogenerator operating in stand-alone mode to account for a present operating load on said variable speed turbogenerator and a transient reserve capability, comprising the steps of:
   receiving a base speed set point for said variable speed turbogenerator;
   determining a speed offset comprising an adjustment to said base speed set point required to accommodate the present operating load and the transient reserve capability;
   determining an adjusted speed set point by combining said speed offset with said base speed set point; and
   setting the rotational speed of said variable speed turbogenerator to said adjusted speed set point.

2. A method for controlling the rotational speed of a turbogenerator operating in stand-alone mode to account for a present operating load on said turbogenerator and a transient reserve capability, comprising the steps of:
   receiving a base speed set point for said turbogenerator;
   determining a speed offset comprising an adjustment to said base speed set point required to accommodate the present operating load and the transient reserve capability;
   determining an adjusted speed set point by combining said speed offset with said base speed set point; and
   setting the rotational speed of said turbogenerator to said adjusted speed set point,
   wherein said base speed set point comprises a baseline speed setting for said turbogenerator calculated based on ambient conditions of said turbogenerator.

3. A method for controlling the rotational speed of a turbogenerator operating in stand-alone mode to account for a present operating load on said turbogenerator and a transient reserve capability, comprising the steps of:
   receiving a base speed set point for said turbogenerator;
   determining a speed offset comprising an adjustment to said base speed set point required to accommodate the present operating load and the transient reserve capability;
   determining an adjusted speed set point by combining said speed offset with said base speed set point; and
   setting the rotational speed of said turbogenerator to said adjusted speed set point,
   wherein determining said speed offset comprises the steps of:
      receiving a sensor feedback signal indicating the present operating load of said turbogenerator;
      determining the transient reserve capability of the turbogenerator based on the present operating load and the operational limits; and
      consulting a look-up table.

4. A method for controlling the rotational speed of a turbogenerator operating in stand-alone mode to account for a present operating load on said turbogenerator and a transient reserve capability, comprising the steps of:
   receiving a base speed set point for said turbogenerator;
   determining a speed offset comprising an adjustment to said base speed set point required to accommodate the present operating load and the transient reserve capability;
   determining an adjusted speed set point by combining said speed offset with said base speed set point; and
   setting the rotational speed of said turbogenerator to said adjusted speed set point,
   wherein determining said speed offset comprises the steps of:
      receiving a sensor feedback signal indicating the present operating load of said turbogenerator;
      determining the transient reserve capability of the turbogenerator based on the present operating load and operational limits; and
      calculating said speed offset using at least one mathematical function.

5. A method for controlling the rotational speed of a turbogenerator operating in stand-alone mode to account for a present operating load on said turbogenerator and a transient reserve capability, comprising the steps of:
   receiving a base speed set point for said turbogenerator;
   determining a speed offset comprising an adjustment to said base speed set point required to accommodate the present operating load and the transient reserve capability;
   determining an adjusted speed set point by combining said speed offset with said base speed set point;
   filtering the adjusted speed set point using an engine dynamics filter; and
   setting the rotational speed of said turbogenerator to the filtered speed set point.

6. The method of claim 5, further comprising the step of trimming the filtered speed set point.

7. The method of claim 6, wherein trimming the filtered speed set point prevents said turbogenerator from exceeding operational limits.

8. The method of claim 6, wherein trimming the filtered speed set point optimizes the operation of the turbogenerator to increase efficiency.

9. The method of claim 6, wherein trimming the filtered speed set point preserves a reserve temperature margin to account for transient reserve loads.

10. The method of claim 6, wherein trimming the filtered speed set point comprises:
    calculating a trim signal based on a sensor feedback signal that indicates an operating parameter selected from the group consisting of speed, load, temperature, and pressure; and
    combining the trim signal with the filtered speed set point.

11. The method of claim 1, further comprising the step of trimming the adjusted speed set point; and
    wherein the step of setting the rotational speed of the variable speed turbogenerator comprises setting the rotational speed to the trimmed speed set point.

12. A method for controlling the rotational speed of a turbogenerator operating in stand-alone mode to account for a present operating load on said turbogenerator and a transient reserve capability, comprising the steps of:
    receiving a base speed set point for said turbogenerator;
    determining a speed offset comprising an adjustment to said base speed set point required to accommodate the present operating load and the transient reserve capability;
    determining an adjusted speed set point by combining said speed offset with said base speed set point;
    trimming the adjusted speed set point wherein trimming said adjusted speed set point preserves a reserve temperature margin to account for the transient reserve capability.

13. The method of claim 11, wherein trimming the adjusted speed set point prevents said variable speed turbogenerator from exceeding operational limits.

14. The method of claim 11, wherein trimming the adjusted speed set point optimizes the operation of the variable speed turbogenerator to increase efficiency.

15. The method of claim 11, wherein trimming said adjusted speed set point comprises:
    calculating a trim signal based on a sensor feedback signal that indicates an operating parameter selected from the group consisting of speed, load, temperature, and pressure; and
    combining the trim signal with the adjusted speed set point.

16. The method of claim 1, wherein setting the rotational speed of said variable speed turbogenerator comprises:
    determining a speed command error by subtracting the actual rotational speed of said variable speed turbogenerator from said adjusted speed set point; and
    inputting said speed command error to a speed control algorithm for controlling a flow control valve.

17. A method for controlling the rotational speed of a variable speed turbogenerator operating in stand-alone mode to account for a present operating load and a transient reserve capability, comprising the steps of:
    receiving a base speed set point for said variable speed turbogenerator;
    determining a speed offset comprising an adjustment to said base speed set point required to accommodate said present operating load and said transient reserve capability;
    determining an adjusted speed set point by combining said speed offset with said base speed set point;
    trimming the adjusted speed set point; and
    setting the rotational speed of said variable speed turbogenerator to the trimmed speed set point.

18. A method for controlling the rotational speed of a turbogenerator operating in stand-alone mode to account for a present operating load and a transient reserve capability, comprising the steps of:
    receiving a base speed set point for said turbogenerator;
    determining a speed offset comprising an adjustment to said base speed set point required to accommodate said present operating load and said transient reserve capability;
    determining an adjusted speed set point by combining said speed offset with said base speed set point;
    trimming the adjusted speed set point; and
    setting the rotational speed of said turbogenerator to the trimmed speed set point,
    wherein said base speed set point comprises a baseline speed setting for said turbogenerator based on ambient conditions of said turbogenerator.

19. A method for controlling the rotational speed of a turbogenerator operating in stand-alone mode to account for a present operating load and a transient reserve capability, comprising the steps of:
    receiving a base speed set point for said turbogenerator;
    determining a speed offset comprising an adjustment to said base speed set point required to accommodate said present operating load and said transient reserve capability;
    determining an adjusted speed set point by combining said speed offset with said base speed set point;
    trimming the adjusted speed set point; and
    setting the rotational speed of said turbogenerator to the trimmed speed set point,
    wherein determining said speed offset comprises the steps of:
        receiving a sensor feedback signal indicating the present operating load of said turbogenerator;
        determining the transient reserve capability of the turbogenerator based on the present operating load; and
        consulting a look-up table.

20. The method of claim 17, wherein trimming said adjusted speed set point comprises:
    calculating a trim signal based on a sensor feedback signal that indicates an operating parameter selected from the group consisting of speed, load, temperature, and pressure; and
    combining the trim signal with the adjusted speed set point.

21. The method of claim 17, wherein trimming said adjusted speed set point prevents said variable speed turbogenerator from exceeding operational limits.

22. The method of claim 17, wherein trimming said adjusted speed set point optimizes the operation of the variable speed turbogenerator to increase efficiency.

23. A method for controlling the rotational speed of a turbogenerator operating in stand-alone mode to account for a present operating load and a transient reserve capability, comprising the steps of:
    receiving a base speed set point for said turbogenerator;
    determining a speed offset comprising an adjustment to said base speed set point required to accommodate said present operating load and said transient reserve capability;
    determining an adjusted speed set point by combining said speed offset with said base speed set point;
    trimming the adjusted speed set point; and
    setting the rotational speed of said turbogenerator to the trimmed speed set point,
    wherein trimming said adjusted speed set point preserves a reserve temperature margin to account for said transient reserve capability.

24. A method for controlling the rotational speed of a turbogenerator operating in stand-alone mode to account for a present operating load and a transient reserve capability, comprising the steps of:
    receiving a base speed set point for said turbogenerator;
    determining a speed offset comprising an adjustment to said base speed set point required to accommodate said present operating load and said transient reserve capability;
    determining an adjusted speed set point by combining said speed offset with said base speed set point;
    trimming the adjusted speed set point;
    setting the rotational speed of said turbogenerator to the trimmed speed set point, and
    filtering said adjusted speed set point with an engine dynamics filter prior to trimming.

25. The method of claim 17, wherein setting the rotational speed of said variable speed turbogenerator comprises:
    determining a speed command error by subtracting the actual rotational speed of said variable speed turbogenerator from said trimmed speed set point; and
    inputting said speed command error to a speed control algorithm for controlling a flow control valve.

* * * * *